Feb. 20, 1934.  H. W. RUPPLE  1,947,799
STOCK GAUGE STOP FOR MACHINE TOOLS
Filed Sept. 4, 1931  3 Sheets-Sheet 1
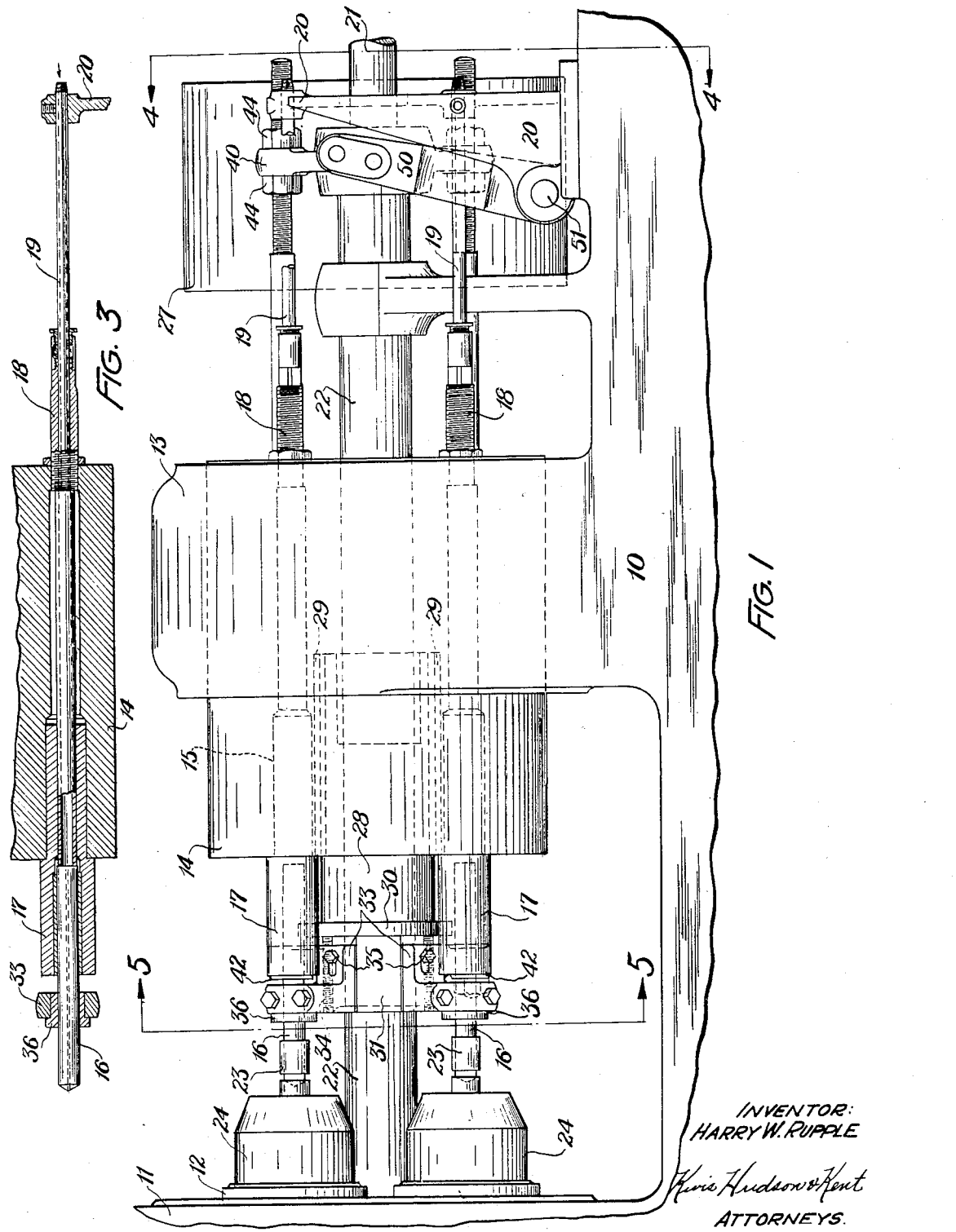
INVENTOR:
HARRY W. RUPPLE
Kwis Hudson & Kent
ATTORNEYS.

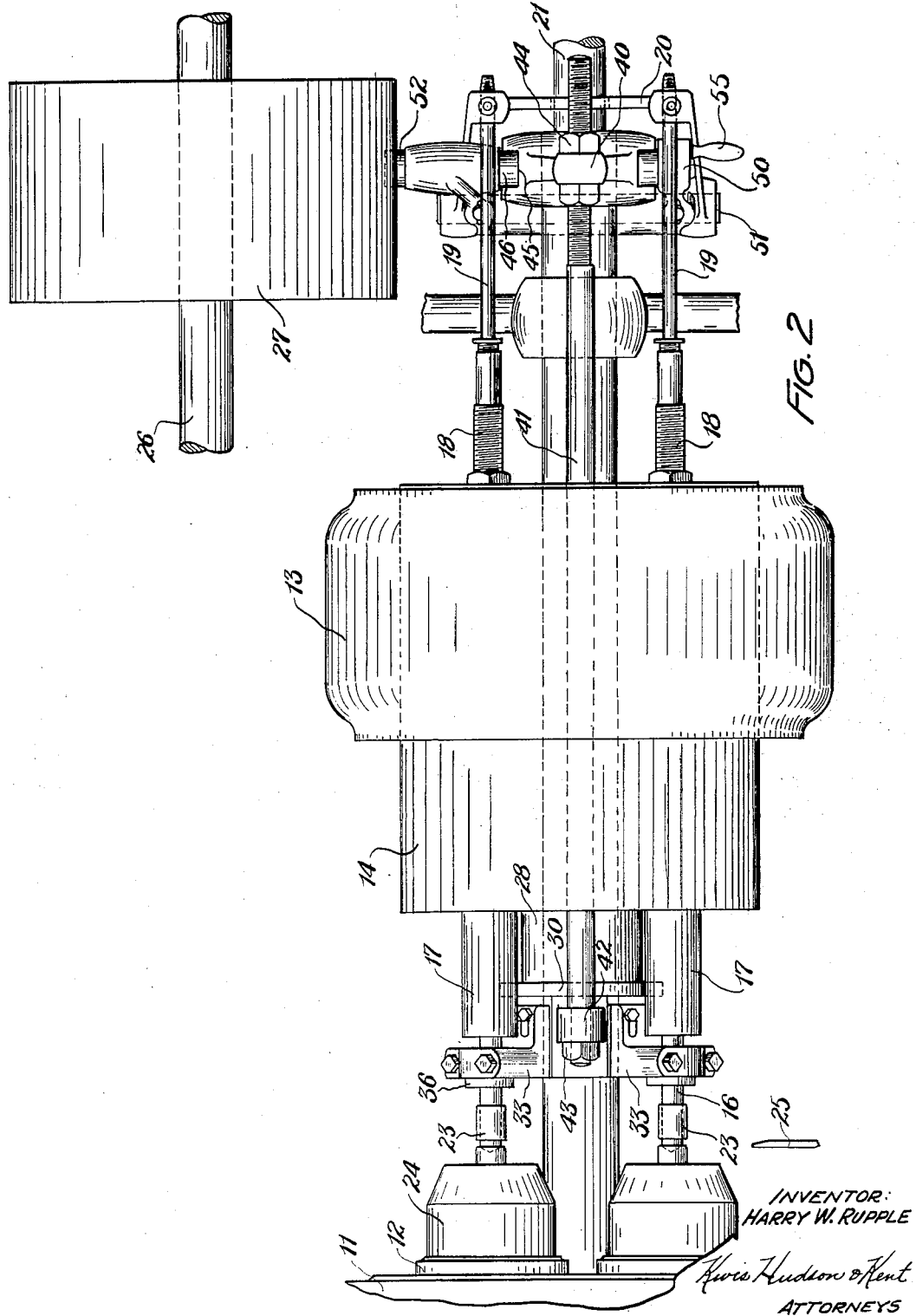

Patented Feb. 20, 1934

1,947,799

UNITED STATES PATENT OFFICE 1,947,799

STOCK GAUGE STOP FOR MACHINE TOOLS

Harry W. Rupple, Shaker Heights, Ohio, assignor to The Cleveland Automatic Machine Company, Cleveland, Ohio, a corporation of Ohio Application September 4, 1931. Serial No. 561,227

12 Claims. (Cl. 82—3)

This invention relates to improvements in automatic metal working machines of the multiple-spindle type wherein a plurality of stock bars or blanks are carried in a plurality of rotatable work carrying spindles mounted in the head of the machine and machined by one or more forming tools carried in a reciprocating tool slide or turret, and more particularly to a new and improved combination stock gauge, tool support and stripping mechanism. Where all of the forming operations upon a single piece of work are performed at one station, multiple-spindle machines increase the production rate and in machines of this type the stock-carrying spindles are usually rotatable in a fixed position and the forming tools are intermittently reciprocated toward and away from the work. Where bar stock is used, means is provided for automatically feeding the stock through the spindles at each completed cycle in the operation of the tool or tools.

An object of this invention is to provide a stock gauging device which operates automatically to properly gauge or limit the amount of stock fed forward during the feeding operation in each of the several spindles. Other objects of this invention are to provide a stock gauging device which will act as a guide or support for the front end of a tool and also as a stripping mechanism to remove the completed work from the tool during the return movement.

Other objects of this invention are to provide a combined gauge stop, tool support, and stripper, which is simple in construction and positive in operation and which will materially increase the production of machines of the class referred to. Further objects and advantages of this invention will be apparent to those skilled in the art from the following disclosure. While the principle of the invention may be embodied in various mechanical forms, the preferred embodiment is described with reference to the accompanying drawings, in which:

Figure 1 is a front elevational view of a multiple-spindle automatic machine tool.

Fig. 2 is a plan view of the machine shown in Fig. 1.

Fig. 3 is a view with portions in section taken through one of the tools and showing the oil system.

Figure 4:
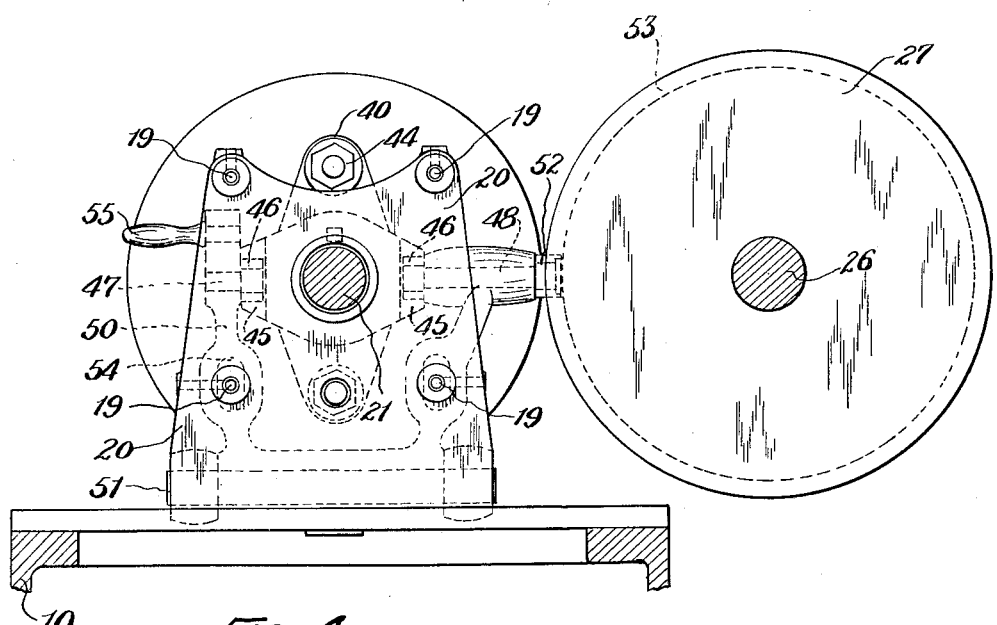
Fig. 4 is a view taken on line 4—4 of Fig. 1.

In machines of the general type referred to it is customary to intermittently feed through each of several spindles carried at one end of the machine, bars of stock and to reciprocate, in timed relationship with the feeding means, a number of tools toward and from the projecting ends of the stock bars. As has been stated above, where the operations necessary to complete an article may be performed at a single position of any one of the spindles, the tools are merely duplicated opposite each of such spindles to increase the output of the machine. In the illustrated embodiment of the invention I have shown at 10 the base or frame of a machine provided at one end with an upstanding projection or support 11 in which is mounted a plurality of rotatable stock spindles 12. Longitudinally aligned with the projection 11 is a similar supporting member or projection 13 in which is slidably mounted a tool carrier 14, provided directly opposite the several spindles, with a series of apertures 15 adapted to receive the shank ends of the tools or tool carrying members as the case may be. In the illustrated embodiment of the invention the tools 16 are non-rotatably carried by tool holders or chucks 17, non-rotatably carried in the apertures 15, but it is understood that they may be rotated in a manner well known in the art if desired. A rod 18 adjustable in the tool slide 14 abuts against the tool and holds it in a fixed position. The rod 18 and the tool are provided with oil ducts for the purpose of supplying oil to the cutting operation. A tube 19 fixed to a bracket 20 on the base 10 is telescoped inside the rod 18. The extending end of the tube 19 is adapted to be attached to an oil supply. While the tools illustrated are boring tools it is understood that other forms of conventional tools may be employed in a similar manner.

The drive shaft for the machine is indicated at 21 and extends axially through both the spindle head 11 and the tool slide 14, and is surrounded by a guide tube 22 extending from the spindle head and projecting through the tool carrier. The work or bar stock is shown at 23 projecting beyond the front ends of chucks 24 carried by the spindles 12. Suitable cut-off mechanism, which is illustrated diagrammatically at 25 in Fig. 2, forms a part of the ordinary structure of this type of machine and is actuated from a main cam shaft 26 at proper intervals to sever the formed blank from the end of the bar. The cam shaft 26 is driven through suitable gearing from the main drive shaft and carries thereon a cam drum 27, the purpose of which will be hereinafter set forth. The tool slide 14 is reciprocated in timed relation to the other mechanism from the cam shaft 26 as is well known in the art by mechanism not shown. The parts of the machine described above are well known in the art and may be found embodied in a plurality of different forms.

Figure 5:
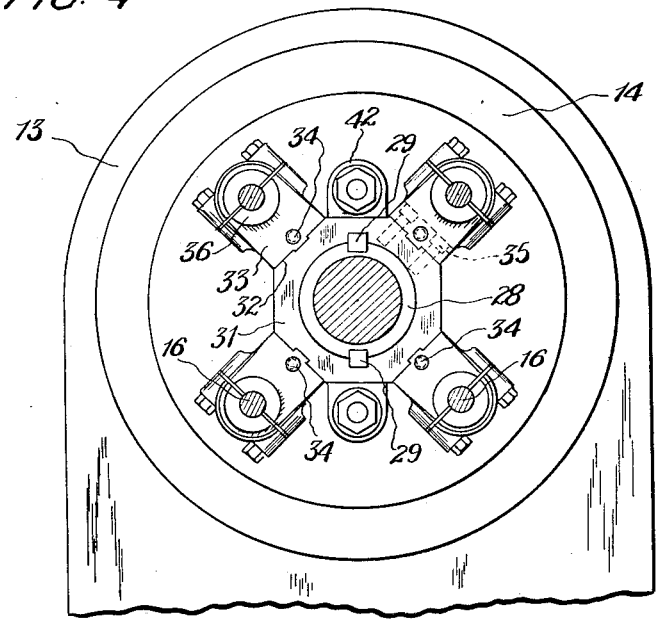
Fig. 5 is a view taken on the line 5—5 of Fig. 1.

A tubular member 28 slidably supported in a suitable aperture in the tool slide 14 is held from rotation therein by keys 29. The left-hand end of the member 28, as viewed in Fig. 1, is reduced in diameter and carries a collar member 30 and a member 31 fixed thereto. The collar member 30 abuts against a shoulder formed by the reduced portion of the member 28. The member 31 is octagonal in shape and provided with guide surfaces 32 on alternate faces thereof. Angular shaped brackets 33 are adjustably carried on the guide surfaces 32 of the member 31. The brackets 33 are provided with adjusting screws 34 which abut against the collar 30 and are clamped in their adjusted position by bolts 35. Gauge members 36 are carried in suitable bosses on the projecting arms of the brackets 33 as shown in Fig. 5.

The member 31 is attached to and adapted to be moved by a member 40 slidably supported on the guide tube 21 by two rods 41. The rods 41 are attached at one end to bosses 42 projecting from the member 31 by nuts 43 and at the other end are adjustably attached to the member 40 by nuts 44 threaded thereon. The member 40 is provided at opposite sides with slots or grooves 45 adapted to receive rollers 46 mounted on pins 47 and 48 carried by a member 50 pivotally mounted on the pin 51 in the bracket 20. The pin 48 carries at one end thereof a cam roller 52 adapted to engage a cam track 53 on the cam drum 27. The member 50 is provided with elongated openings 54 to accommodate the oil tubes 19. A hand grasp 55 is provided on the member 50 for manual operation.

The operation of the machine is as follows: The gauge members 36 project in the path of the stock at all times and limit its forward feed in the chucks 24. The gauge members may be individually adjusted in the event that different lengths of work are being produced at different positions, etc., by means of the bolts 35 and the screws 34. The tools project through the gauge members 36 and are supported at their outer end thereby. The gauge members 36 and the tool slide 14 are given independent reciprocation in definite timed relation, all controlled from the cam shaft 26, and after the work has been separated from the stock it is stripped from the tool by the gauge members 36 which materially increases the speed of production, etc., inasmuch as it is not necessary to withdraw the tools from the work before severing the same from the stock bars.

From the above description it will be apparent that I have produced a combination gauge stop, tool guide or support and blank stripper which may be applied to conventional machines of the type described, or which may be embodied in the original design of machines of this type and which will be rigid in construction and positive in operation. The embodiment of the invention described and illustrated is merely the preferred form, and I do not wish to be limited to the particular construction shown, which may be varied within the scope of this invention, and particularly point out and claim as my invention:

1. In a machine of the character described, the combination of a frame, a spindle rotatably carried on said frame and adapted to carry a work piece automatically fed therethrough, a member slidably carried by said frame and adapted to carry a tool, means non-rotatably carried by said member adapted to limit the feed of the work piece in said spindle, and means for automatically moving the last mentioned means at predetermined intervals relative to said spindle independent of said member.

2. In machine comprising a rotatable work spindle through which a work piece is automatically fed, the combination of a member adapted to carry a tool, a second member carried by said first mentioned member, means for automatically moving said second mentioned member at predetermined intervals independent of the first mentioned member, and means on said second member adapted to surround and support the tool and limit the forward feed of the work.

3. In a machine of the character described, the combination of a frame, a spindle rotatably carried on said frame and adapted to support a work piece automatically fed therethrough, a tool slide carried on said frame, a member non-rotatably carried by said tool slide and guided on said frame, means for moving said member relative to said spindle independent of said tool slide, and means on said member adapted to surround and guide a tool and limit the feed of the work piece in the spindle.

4. In a machine of the character described, the combination of a frame, a work spindle rotatably mounted on said frame and adapted to carry a work piece automatically fed therethrough, a tool slide reciprocally mounted on said frame, a member on said frame extending between said work spindle and said tool slide, a collar non-rotatably supported by said member, means on said collar extending in the path of the work for limiting the feed thereof and adapted to surround and support a tool, and means for moving said collar relative to said work spindle and said tool slide.

5. In a machine of the character described, the combination of a frame, a spindle rotatably carried on said frame and adapted to support a work piece automatically fed therethrough, a tool slide carried on said frame, a member slidably carried by said tool slide in keyed relation thereto, means for moving said member relative to said spindle independent of said tool slide, and adjustable means on said member adapted to support a tool and limit the forward feed of the work.

6. In a machine of the character described, the combination of a frame, a work spindle rotatably mounted on said frame and adapted to carry a work piece automatically fed therethrough, a tool slide reciprocally mounted on said frame, a member on said frame extending between said work spindle and said tool slide, a sleeve non-rotatably carried by said tool slide and positioned about said member, a collar carried on said sleeve, members on said collar adapted to support a tool and project in the path of the work to limit the feed thereof, means for adjusting said second mentioned members on said collar, and means pivotally supported on the frame and operatively connected to said collar for moving said members relative to the spindle independent of the tool slide.

7. In a machine of the character described, the combination of a frame, a plurality of work spindles rotatably supported by said frame equally spaced about a common axis parallel to the axis of said work spindles, a tool slide supported by said frame adapted to support a tool for engagement with a work piece supported by one of said work spindles, a member supported in axial alignment with said common axis, means for moving said member relative to said work spindles, and means on said member adapted to support said tool.

8. In a machine of the character described, the combination of a frame, a plurality of work spindles adapted to have work fed through the center thereof rotatably supported by said frame equally spaced about a common axis parallel to the axis of said work spindles, a tool slide supported by said frame adapted to support a tool for engagement with a work piece supported by one of said work spindles, a member non-rotatably supported in axial alignment with said common axis, means for moving said member relative to said work spindles, and a stock gauge on said member adapted to continuously project in the path of said work.

9. In a machine of the character described, the combination of a frame, a plurality of work spindles adapted to have work fed through the center thereof rotatably supported by said frame equally spaced about a common axis parallel to the axis of said work spindles, a tool slide supported by said frame adapted to support a tool for engagement with a work piece supported by one of said work spindles, a member supported in axial alignment with said common axis, means for moving said member relative to said work spindles, and means supported by said member adapted to surround and support said tool and limit the forward feed of the work.

10. In a machine of the character described, the combination of a frame, a plurality of work spindles adapted to have work automatically fed therethrough rotatably supported by said frame equally spaced about a common axis, a tool slide supported by said frame adapted to support a plurality of tools in axial alignment with said work spindles, a member slidably supported by said tool slide in axial alignment with said common axis, means on said member adapted to engage and support said tools, and means for moving said member independent of the movement of said tool slide.

11. In a machine of the character described, the combination of a frame, a plurality of work spindles adapted to have work automatically fed therethrough rotatably supported by said frame equally spaced about a common axis, a tool slide supported by said frame adapted to support a plurality of tools in axial alignment with said work spindles, a member non-rotatably supported by said tool slide in axial alignment with said common axis, means on said member projecting in the path of said work pieces and limiting the forward feed thereof through said work spindles, and means for moving said member independent of the movement of said tool slide.

12. In a machine of the character described, the combination of a frame, a plurality of work spindles adapted to have work automatically fed therethrough rotatably supported by said frame equally spaced about a common axis, a tool slide supported by said frame adapted to support a plurality of tools in axial alignment with said work spindles, a member slidably supported by said tool slide in axial alignment with said common axis, and means supported by said member adapted to engage and support said tools and projecting in the path of said work pieces thereby limiting the feed of the same through said work spindles.

HARRY W. RUPPLE.